United States Patent [19]

Cislo

[11] 4,042,258
[45] Aug. 16, 1977

[54] TORSION BAR MOUNTING ARRANGEMENT

[75] Inventor: Casimer J. Cislo, Detroit, Mich.

[73] Assignee: General Motors Corporation, Detroit, Mich.

[21] Appl. No.: 699,794

[22] Filed: June 25, 1976

[51] Int. Cl.² .............................................. B60G 11/18
[52] U.S. Cl. ..................................... 280/664; 267/57; 280/695; 280/700
[58] Field of Search ............... 280/695, 700, 721, 722, 280/723, 664, 665; 267/57

[56] References Cited

U.S. PATENT DOCUMENTS

| | | | |
|---|---|---|---|
| 2,972,489 | 2/1961 | Collier | 280/664 |
| 3,028,173 | 4/1962 | Leffler | 280/664 |
| 3,037,789 | 6/1962 | Allison | 280/695 |

FOREIGN PATENT DOCUMENTS 2,127,146   2/1922   Germany .............................. 280/721

*Primary Examiner*—Philip Goodman
*Assistant Examiner*—John A. Carroll
*Attorney, Agent, or Firm*—John P. Moran

[57] ABSTRACT

A torsion bar mounting arrangement for a vehicular suspension system, including a lower control arm formed to include a trunk portion and a pair of leg portions, with a relatively wide trough formed in the upper surface of the trunk portion, a load reaction member having a narrow body portion inserted between the leg portions and seated in the trough, and a preloaded torsion bar secured to the head portion of the load reaction member, with some fore-and-aft movement of the trough permitted relative to the body portion of the load reaction member in response to load inputs into the system, resulting in improved ride characteristics while virtually eliminating bending of the torsion bar.

5 Claims, 6 Drawing Figures

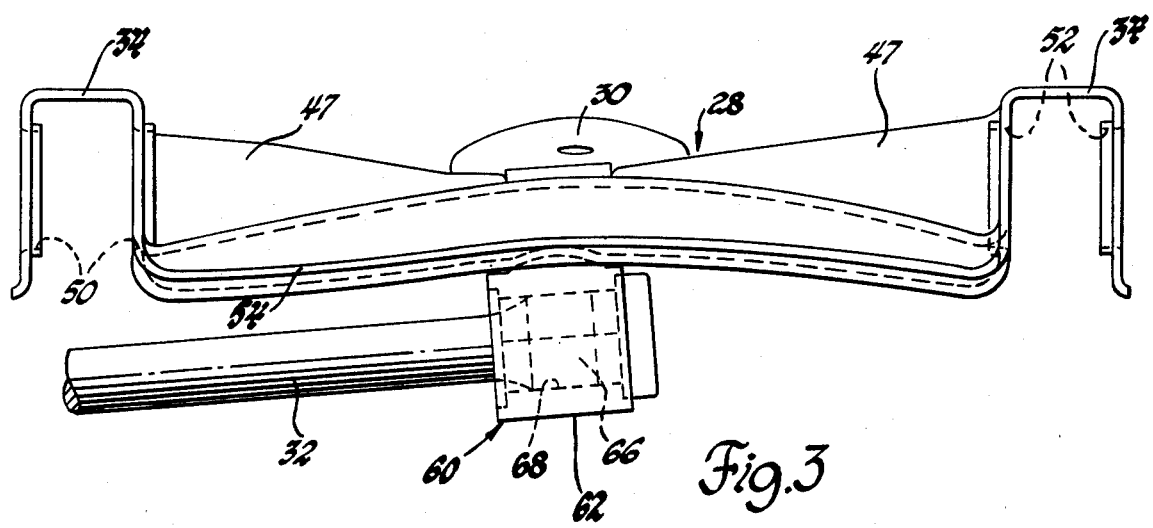
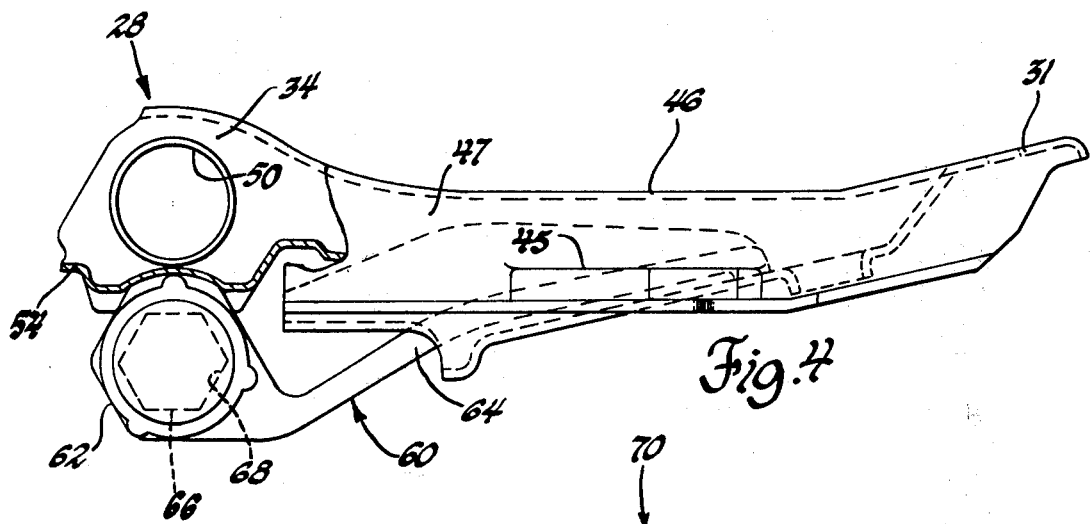
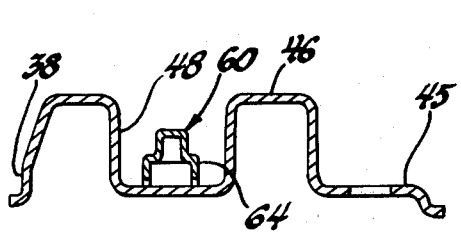
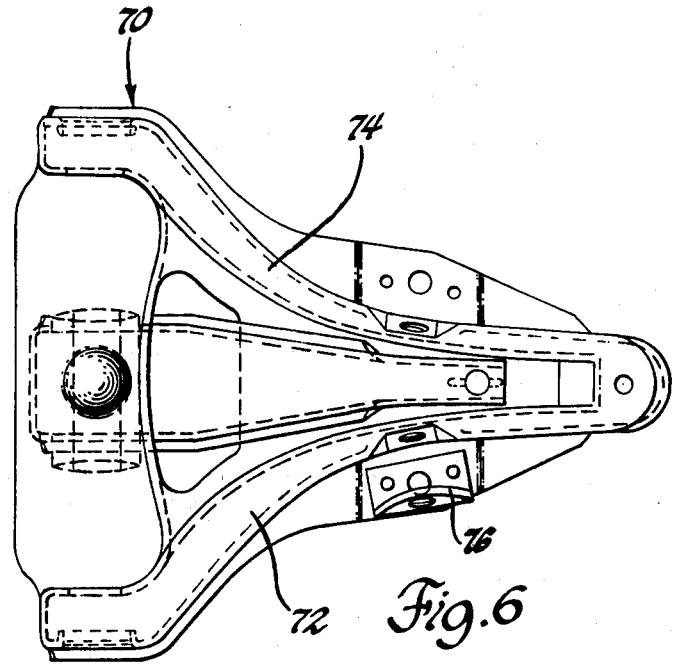

TORSION BAR MOUNTING ARRANGEMENT

This invention relates generally to vehicular torsion bar type suspension systems and, more particularly, to an improved torsion bar mounting arrangement.

Heretofore, torsion bars have generally been rigidly connected at one end thereof to suspension control arms by way of a spline or socket which is an integrally formed part of the arm structure.

It is an object of this invention to provide an improved torsion bar mounting arrangement including means for permitting relative movement between the lower control arm and the torsion bar in response to load inputs into the suspension system from tire impacts due to uneven terrain, for improved impact feel and for minimizing torsion bar bending.

Another object of the invention is to provide an improved torsion bar mounting arangement including a separate load reaction member secure to an end of a preloaded torsion bar and urged by the latter into engagement with a portion of a lower control arm, while permitting relative sliding movement between such engaged arm and load reaction member.

A further object of the invention is to provide a torsion bar mounting arrangement wherein a lower control arm is formed to include a relatively wide trough in its upper surface, with the shank portion of a load reaction member mounted therein and urged into contact with the bottom surface of the trough by a preloaded torsion bar fixedly secured to the head portion of the load reaction member, permitting relative sliding movement of the control arm and the load reaction member during operational conditions.

These and other objects and advantages of the invention will be apparent when reference is made to the following description and accompanying drawings, wherein.

Figure 2:
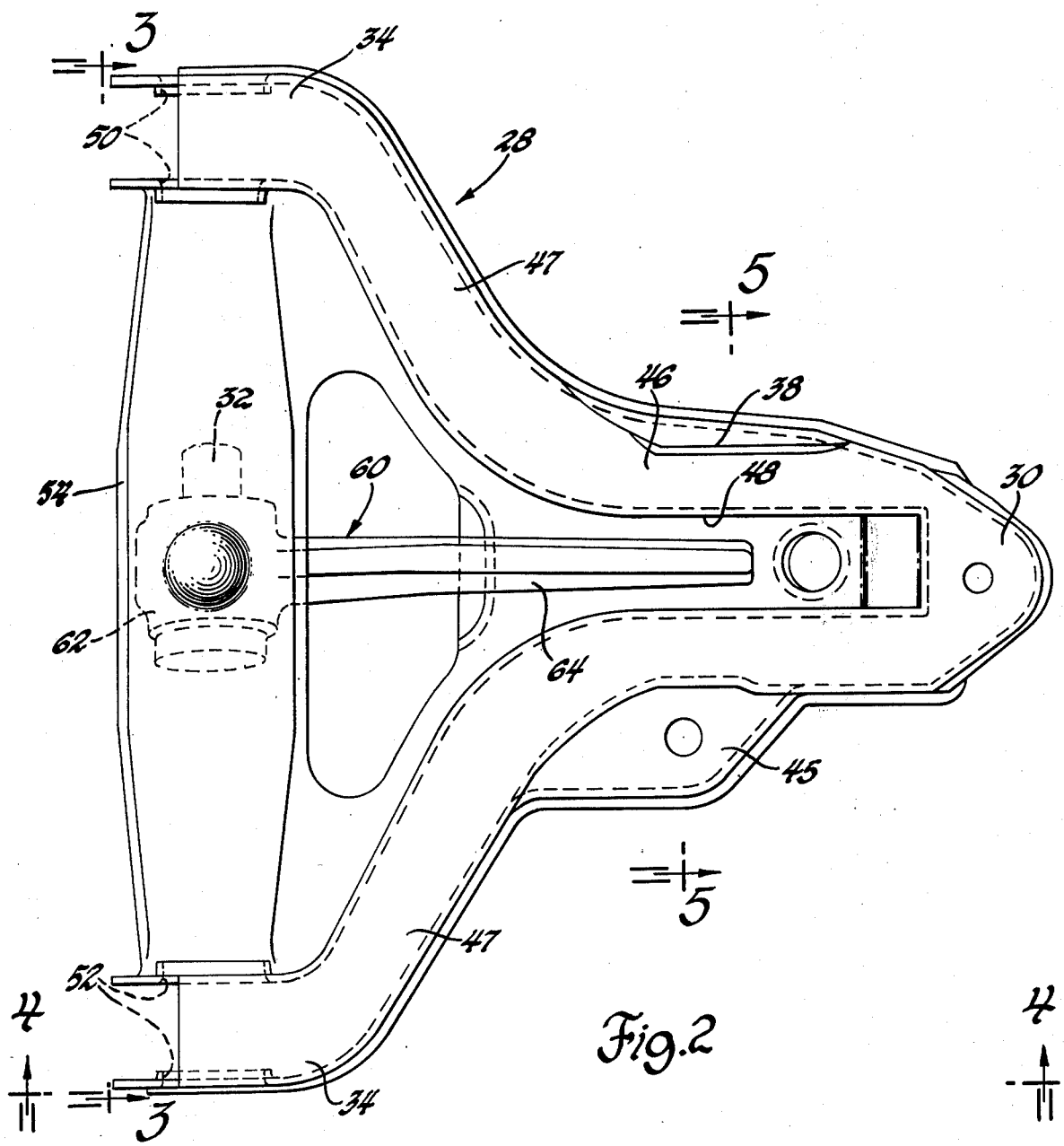
FIG. 2 is an enlarged plan view of a portion of FIG. 1 structure illustrating the invention components.

FIGS. 3, 4 and 5 are end, side, and cross-sectional views taken along the lines 3—3, 4—4 and 5—5, respectively, of FIG. 2, and looking in the direction of the arrows; and FIG. 6 is a plan view of an alternate embodiment of the invention, similar to the FIG. 2 arrangement.

Figure 1:
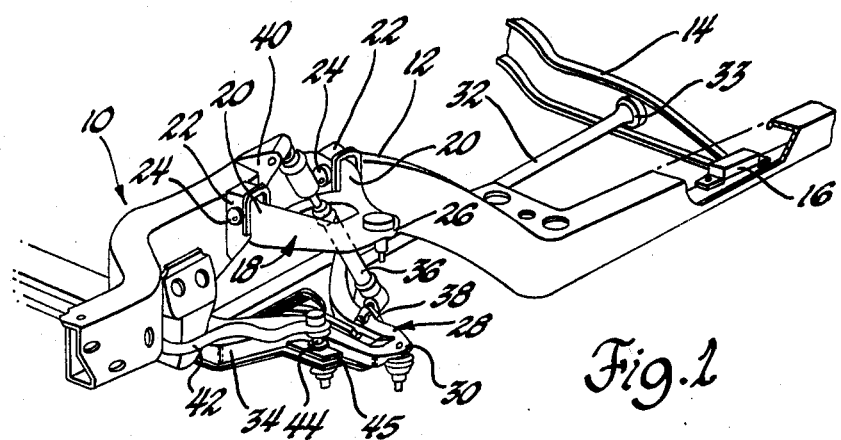
FIG. 1 is a fragmentary perspective view of a vehicular frame and front suspension system embodying the invention.

Referring now to the drawings in greater detail, FIG. 1 illustrates a vehicular front suspension system 10 including a frame side rail 12 with a cross-member 14 secured thereto by a suitable bracket 16. A generally Y-shaped upper control arm 18 is pivotally secured adjacent the inner bifurcated ends 20 thereof to brackets 22 mounted on the side rail 12 by adjustable cam-bolts 24. The outer end 26 of the upper control arm 18 is adapted to being connected to a steering knuckle (not shown).

A generally Y-shaped lower control arm 28 is located substantially directly beneath the upper arm 18, with the outer end 30 also adapted to being connected to the steering knuckle (not shown). A torsion bar 32 is secured at the rear end 33 thereof to the front face of the cross-member 14 a predetermined distance from the bracket 16, extending forwardly therefrom to a point intermediate the inner bifurcated ends 34 of the lower control arm 28 and preloaded to perform in a manner to be described.

A shock absorber 36 is secured at the lower end thereof by a suitable fastener to a flat portion 38 of a side wall of the lower control arm 28 adjacent the outer end 30 thereof. The shock absorber 36 extend upwardly, between the bifurcated ends 20 of the upper control arm 18, to a bracket 40 mounted on the side rail 12, to which it is secured by a suitable fastener. A substantially laterally extending stabilizer bar 42 is secured at one end thereof by suitable fastener means 44 to a shelf or flange 45 formed on the side wall of the lower control arm 28 opposite the side wall flat portion 38 on which the lower end of the shock absorber 36 is mounted.

Referring now to FIGS. 2–5, it may be noted that the lower control arm 28 is formed to include a trunk portion 46 and two leg portions 47, with an open-ended trough 48 formed along the length of the trunk portion 46, in the upper surface thereof. Generally aligned openings 50 and 52 are formed in respective bifurcated ends 34 of the leg portions 47. A contoured bracket or wall portion 54 (FIG. 3) is formed between the ends 34 just below the openings 50 and 52.

A load reaction member 60 includes a head portion 62 and a body portion 64. The body portion 64 is inserted upwardly (FIG. 4) between the bifurcated legs of the lower control arm 28 and laterally along the trough 48. The body portion 64 is urged downwardly into engagement with the bottom of the trough 48 by the preloaded torsion bar 32 whose forward end portion 66 is hexagonally shaped and mounted in a hexagonal opening 68 formed in the reaction member head portion 62. The latter may be urged upwardly against the under surface of the wall portion 54 by the preloaded torsion bar 32. Suitable pads (not shown) for dampening and noise abatement purposes may be mounted in the bottom of the trough 48 for engagement by the body portion 64 of the load reaction member 60, and/or on the under surface of the wall portion 54 for engagement by the head portion 62 of the load reaction member 60.

FIG. 6 illustrates a lower control arm 70 which is similar in function to the lower control arm 28, but which is formed to include symmetrical left and right side portions 72 and 74, so as to be readily mountable for use with either of the front wheels, thus eliminating the need for manufacturing left and right hand lower control arms which are mirror images of one another. A bracket 76 is secured to one side of the arm 70, providing for the mounting thereon of the shock absorber 36 (FIG. 1).

In operation, it may be noted that, by virtue of the narrow width of the body portion 64 of the load reaction member 60 and the relatively wide width of the trough 48 in the lower control arm 28, the member 60 and the arm 28 are able to move sidewardly relative to one another during any fore-and-aft movements of the arm 28 in response to load inputs into the suspension system, such as, for example, the reaction on the arm 28 of the front wheels coming into contact with uneven tarrain. Thus, there results a reduction in stresses in the torsion bar 32 and in the pivot points of the lower arm 28, providing longer durability of the parts involved and virtually eliminating visible bowing of the bar 32, while producing improved ride characteristics, together with initially providing greater ease of assembly.

It should be apparent that the lower control arms 28 and 70 may each be formed as either a sheet metal stamping or a casting of some suitable material, such as nodular iron.

While but two basic embodiments of the invention have been shown and described, other modifications thereof are possible.

What is claimed is:

1. For use with an automotive front suspension system, a torsion bar mounting arrangement comprising a lower control arm having a central trunk portion and a pair of spaced-apart leg members extending from one end of said central trunk portion, an open-ended trough formed in said central trunk portion, a preloaded torsion bar mounted so as to have one end thereof positioned opposite said open-ended trough, and a load-reaction member secured at one end thereof to said one end of said torsion bar substantially normal to the axis thereof and extending therefrom into said open-ended trough so as to be maintained in engagement therewith by said preloaded torsion bar, said open-ended trough being wider than said load-reaction member for permitting some fore-and-aft movement of said trough relative to said load-reaction member in response to load inputs into said suspension system, thereby improving ride characteristics and minimizing bending of said torsion bar.

2. For use with an automotive front suspension system, a torsion bar mounting arrangement comprising a lower control arm having a central trunk portion and a pair of leg members extending in V-shape from one end of said central trunk portion, an open-ended trough formed in said central trunk portion, a bracket formed intermediate the free ends of said pair of leg members, an opening formed in one end of said bracket, a preloaded torsion bar mounted so as to have one end thereof extended through said opening to a point opposite said open-ended trough, and a load-reaction member secured at one end thereof to said one end of said torsion bar substantially normal to the axis thereof and extending therefrom into said open-ended trough so as to be maintained in engagement therewith by said preloaded torsion bar, said open-ended trough being wider than said load-reaction member, permitting some fore-and-aft movement of said trough relative to said load-reaction member in response to load inputs into said suspension system, thereby improving impact feel and substantially preventing bending of said torsion bar.

3. The torsion bar mounting arrangement described in Claim 2, wherein opposite sides of said trunk portion and said pair of leg members are symmetrical about the center line of said lower control arm.

4. For use with an automotive front suspension system, a torsion bar mounting arrangement comprising a lower control arm having a central trunk portion and a pair of leg members extending in a V-shape from one end of said central trunk portion, an open-ended trough formed in said central trunk portion, a bracket intermediate the free ends of said pair of leg members, an opening formed in one end of said bracket, a preloaded torsion bar mounted so as to have one end thereof extended through said opening to a point opposite said open-ended trough, and load-reaction member having a head portion and a body portion and secured at said head portion thereof to said one end of said torsion bar substantially normal to the axis thereof having the body portion extending therefrom into said open-ended trough so as to be maintained in engagement with the bottom surface thereof while said head portion is maintained in engagement with the under side of said bracket by said preloaded torsion bar, said open-ended trough being wider than said load-reaction member, permitting some fore-and-aft movement of said trough relative to said load-reaction member in response to load inputs into said suspension system, thereby improving impact feel and substantially preventing bending of said torsion bar.

5. An automotive front suspension system for use with a vehicular frame and comprising upper and lower control arms, each having a trunk portion and a pair of leg members extending in a V-shape from one end of said trunk portion, said leg members being pivotally connected to said frame and said trunk portions being adapted to be connected to a steering knuckle, an open-ended trough formed in said trunk portion of said lower control arm, a shock absorber connected between one side of said trunk portion and said frame, and means formed on the other side of said trunk portion adapted to have a stabilizer bar connected thereto, a bracket formed intermediate the free ends of said pair of leg members, an opening formed in one end of said bracket a preloaded torsion bar mounted so as to have one end thereof secured to said frame and the other end thereof extended through said opening to point opposite said open-ended trough, and a load-reaction member secured at one end thereof to said other end of said torsion bar substantially normal to the axis thereof and extending therefrom into said open-ended trough so as to be maintained in engagement therewith by said preloaded torsion bar, said open-ended trough being wider than said load-reaction member, permitting some fore-and-aft movement of said trough relative to said load-reaction member in response to load inputs into said suspension system, thereby improving impact feel and minimizing bending of said torsion bar.

* * * * *